United States Patent Office 2,902,383
Patented Sept. 1, 1959

2,902,383

CELLULOSE TRIACETATE COMPOSITION

Lawrence F. Beste, Wilmington, Del., assignor to E. I. du Pont de Nemours and Company, Wilmington, Del., a corporation of Delaware No Drawing. Application September 25, 1957
Serial No. 686,035

10 Claims. (Cl. 106—189)

The present invention relates to a novel and useful composition of matter. More particularly it relates to a composition containing cellulose triacetate which is useful for the production of shaped articles by conventional spinning, casting, and coating procedures.

It is known that the properties of shaped structures of cellulose triacetate are generally superior to those produced from the partially hydrolyzed acetate. Thus, fabrics produced from cellulose triacetate have better pleat retention, improved wrinkle resistance, and better ironability due to the stability of triacetate at higher temperatures. In spite of these good properties, however, the hydrolyzed form is generally employed for spinning as it is soluble in many of the common volatile solvents and the triacetate is not. While some solvents have been found for cellulose triacetate, these are seldom used in commercial production as they are either highly corrosive or very toxic. For example, it has been found in the laboratory that propargyl alcohol dissolves the triacetate to give a clear viscous solution containing 21% polymer. The toxicity of the alcohol, however, renders it unsuitable for commercial use.

It is an object of the present invention therefore to provide a composition of matter comprising cellulose triacetate and a solvent. Another object is to provide a solution of cellulose triacetate from which shaped structures may be spun or cast. A further object is to provide a solution which is suitable for coating articles with cellulose triacetate. Other objects will appear hereinafter as the description of the invention proceeds.

These objects are accomplished by the present invention which provides a composition of matter comprising cellulose triacetate and a polyfluorinated alcohol of the formula $$X(CF_2)_n CH_2OH$$

wherein X is selected from the group consisting of hydrogen and fluorine and $n$ is an integer of from 1 to 4 inclusive. In a preferred embodiment of this invention, the composition of mattter is a solution and consists essentially of cellulose triacetate and the polyfluorinated alcohol. The term "consists essentially of" is used to designate that other solvents or polymers may be present in the solution which do not affect the character of the solution or its behavior in use.

The present compositions in general may be formed by merely suspending the polymer in the solvent, although, in most instances it is preferred that the mixture be stirred and sometimes heated in order to hasten the dissolving action of the solvent.

The following examples are cited to illustrate the invention and are not intended to limit it in any manner.

SOLUBILITY OF CELLULOSE TRIACETATE IN THE ALCOHOLS

To determine the solubility of the polymer in the specified solvents of the general formula $X(CF_2)_n CH_2OH$, finely divided cellulose triacetate is stirred in the indicated solvent at room temperature. The following approximate amounts are found attainable in 100 cc. of the solvent:

| Example | $n$ | X | Solubility |
|---|---|---|---|
| 1 | 1 | F | more than 20 grams. |
| 2 | 2 | H | more than 30 grams. |
| 3 | 3 | F | more than 20 grams. |
| 4 | 4 | H | more than 15 grams. |

As is hereinafter demonstrated, all of these concentrations are sufficient for extruding filaments of relatively low denier. Of course, much lower concentrations would be sufficient to cast films or coat materials with these solutions.

*Example*

Cellulose triacetate made from cotton linters and having a combined acetic acid content of 62.0% and a WS viscosity of 231 (i.e. 1000× the specific viscosity of a 0.00913% solution of the polymer in 92% glacial acetic acid measured at 25° C. in a modified Ostwald viscosimeter) and 2,2,3,3-tetrafluoropropanol (redistilled through a packed column) having a boiling point of 108° C. are used in this example. 150 cc. of the tetrafluoropropanol and 2 cc. of water are used to dissolve 37.5 grams of the cellulose triacetate to produce a clear solution of 25 grams polymer per 100 cc. of solvent, or a concentration of 14.5% by weight. Viscosity measurements show that water does not improve the solvency of the alcohol but its addition results in the formation of a clear solution (i.e. without it a slightly turbid solution results). This mixture is dry-spun through an ordinary dry spinning apparatus under the following conditions:

| | |
|---|---|
| Head temperature | 68° C. |
| Pressure | 75 p.s.i. |
| Type spinneret | Protrusion. |
| Orifices | 5 hole of 0.005 in. diameter |
| Spinneret temperature | 81° C. |
| Nitrogen temperature | 117° C. |
| Column temperature top | 165° C. |
| Column temperature bottom | 155° C. |
| Rate of gas flow | 4 cubic ft. per minute. |
| Wind-up speed | 165 y.p.m. |
| Spin stretch factor | 3.9:1 |
| Cross section | Uniform dog bone. |

The wound up yarn has a residual solvent content of 21.5% based on its dry weight. A sample of this yarn, when left untouched for three days on the bobbin, is found to have a residual solvent content of 4.5%.

A sample of this yarn which has been plied up to 20 filaments is boiled off by the standard technique and tested for its physical properties.

| | | |
|---|---|---|
| Tenacity | g.p.d | 0.70 |
| Elongation | percent | 12 |
| Initial modulus | g.p.d | 24 |
| Denier per filament | | 6.1 |
| Work recovery at 1% elongation | percent | 75 |
| Work recovery at 3% elongation | do | 37 |
| Work recovery at 5% elongation | do | 27 |
| Loop tenacity | g.p.d | 0.65 |
| Loop elongation | percent | 11 |

A sample of this yarn is extracted with cold water for about 2 hours and then drawn 1.57× in water at 98° C. The yarn then has the following characteristics:

| | | |
|---|---|---|
| Tenacity | g.p.d | 0.80 |
| Elongation | percent | 5.2 |
| Initial modulus | g.p.d | 41 |

| | |
|---|---|
| Denier per filament | 4.0 |
| Work recovery at 1% elongation ___percent__ | 73 |
| Work recovery at 3% elongation ___do____ | 32 |
| Loop tenacity ___g.p.d__ | 0.75 |
| Loop elongation ___percent__ | 4.1 |

As seen from this example, the yarn characteristics change only slightly upon drawing which would be expected, since a draw ratio of only 1.57× is obtained and the initial yarn is wound up at a wind-up stretch factor of 3.9:1.

The solvents which may be used in the practice of this invention are all primary alcohols of from 2 to 5 carbon atoms which bear at least 2 fluorine atoms on each carbon except for the carbon bearing the hydroxyl group. The solvents are all non-toxic, water soluble, and cover a convenient range of boiling points (i.e., from about 72° C. to about 140° C.) so that they may be dry spun according to conventional procedures. Among such suitable solvents are 2,2-difluoroethanol, 2,2,2-trifluoroethanol, 2,2,3,3-tetrafluoropropanol, 2,2,3,3,3-pentafluoropropanol, 2,2,3,3,4,4-hexafluorobutanol, 2,2,3,3,4,4,4-heptafluorobutanol, 2,2,3,3,4,4,5,5-octafluoropentanol, and 2,2,3,3,4,4,5,5-nonafluoropentanol.

These solvents, while they may be used by themselves, may also be used mixed with each other or with minor amounts of other solvents. For example, the higher homologues of these solvents or the chlorinated or brominated analogues may be mixed therewith. The chlorinated and brominated analogues, however, tend to be toxic and high boiling and for this reason are not preferred. Water may also be mixed with the solvents of this invention and in many instances, particularly when the polymer concentration is low, tends to clarify the solution (i.e., the water apparently dissolves the minor amounts of impurities found in the cellulose triacetate which cause turbidity). Other solvents such as chloroform, methylene chloride, ethylene chloride, chlorobenzene, 1,1,2-trichloroethane and the like may also be employed in minor amounts.

The preferred concentration of the polymer in the composition of the present invention is from about 5 to about 60 grams of cellulose triacetate per 100 grams of solvent. The lower concentrations are useful in the manufacture of films or other cast products as well as coatings. The concentrations which are best suited for the extrusion of films or the spinning of medium to low denier fibers is from about 10 to about 30 grams of polymer per 100 cc. of solvent. Concentrations above this range are mainly useful as plasticized compositions for plasticized melt spinning or molding procedures.

The compositions of the present invention may also contain other ingredients such as minor amounts of dyes, pigments and the like dissolved or dispersed in the composition. By using such materials colored structures may be directly produced without a subsequent dyeing step.

The solvent of this invention and solutions of the polymer therein are also useful in mending, sealing, and joining tapes, films, and massive shaped objects formed from cellulose triacetate.

Many other equivalent modifications will be apparent to those skilled in the art from a reading of the foregoing without a departure from the inventive concept.

What is claimed is:

1. A composition consisting essentially of cellulose triacetate and a polyfluorinated alcohol of the formula

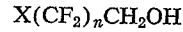

$$X(CF_2)_n CH_2OH$$

wherein X is selected from the group consisting of hydrogen and fluorine and $n$ is an integer of from 1 to 4.

2. The composition of matter of claim 1 wherein X is hydrogen.

3. The composition of matter of claim 1 wherein X is fluorine.

4. A solution consisting essentially of cellulose triacetate and a polyfluorinated alcohol of the formula

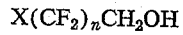

$$X(CF_2)_n CH_2OH$$

wherein X is selected from the group consisting of hydrogen and fluorine and $n$ is an integer of from 1 to 4.

5. The solution of claim 4 wherein X is hydrogen.

6. The solution of claim 4 wherein X is fluorine.

7. The solution of claim 4 wherein the polyfluorinated alcohol is 2,2,3,3,-tetrafluoropropanol.

8. The solution of claim 4 wherein the polyfluorinated alcohol is 2,2,2-trifluoroethanol.

9. The solution of claim 4 wherein the polyfluorinated alcohol is 2,2,3,3,4,4,4-heptafluorobutanol.

10. The solution of claim 4 wherein the polyfluorinated alcohol is 2,2,3,3,4,4,5,5-octafluoropentanol.

References Cited in the file of this patent

UNITED STATES PATENTS

| | | |
|---|---|---|
| 2,047,598 | Salzberg et al. | July 4, 1936 |
| 2,056,787 | Henne | Oct. 6, 1936 |
| 2,336,921 | Benning et al. | Dec. 14, 1943 |
| 2,559,628 | Joyce | July 10, 1951 |
| 2,666,797 | Husted et al. | Jan. 19, 1954 |

OTHER REFERENCES

Brice et al.: "Fluorchemicals Today and Tomorrow," Chem. and Eng. News, vol. 31 (1953), pp. 510–513.